US012671252B2

(12) United States Patent (10) Patent No.: US 12,671,252 B2

Wang et al. (45) Date of Patent: Jun. 30, 2026

(54) POWER PREDICTION METHOD AND APPARATUS, AND DEVICE

(71) Applicant: Huawei Technologies Co., Ltd., Shenzhen (CN)

(72) Inventors: Shuqian Wang, Hangzhou (CN); Feng Chai, Fuzhou (CN); Weixiang Jiang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 408 days.

(21) Appl. No.: 18/183,473

(22) Filed: Mar. 14, 2023

(65) Prior Publication Data

US 2023/0216296 A1     Jul. 6, 2023

Related U.S. Application Data

(63) Continuation of application No. PCT/CN2021/106964, filed on Jul. 17, 2021.

(30) Foreign Application Priority Data

Sep. 15, 2020     (CN) .......................... 202010966481.7

(51) Int. Cl.
*H02J 3/00* (2006.01)
*G06Q 10/04* (2023.01)
*H02J 3/008* (2026.01)

(52) U.S. Cl.
CPC .............. *H02J 3/003* (2020.01); *G06Q 10/04* (2013.01); *H02J 3/008* (2013.01)

(58) Field of Classification Search
CPC . H02J 3/003; H02J 3/28; G06Q 10/04; G06N 20/00
See application file for complete search history.

(56) References Cited

U.S. PATENT DOCUMENTS

| | | | |
|---|---|---|---|
| 8,843,427 B1 * | 9/2014 | Lin ........................ | G06N 20/00 |
| | | | 705/16 |
| 2018/0060738 A1 | 3/2018 | Achin et al. | |
| 2018/0082224 A1 | 3/2018 | Leslie et al. | |
| 2021/0021126 A1 * | 1/2021 | Hall ........................ | H02J 3/28 |

FOREIGN PATENT DOCUMENTS

| | | |
|---|---|---|
| CN | 106875033 A | 6/2017 |
| CN | 109657856 A | 4/2019 |
| CN | 109816196 A | 5/2019 |

* cited by examiner

*Primary Examiner* — Lam S Nguyen

(74) *Attorney, Agent, or Firm* — Conley Rose, P.C.

(57) ABSTRACT

A power prediction method includes obtaining evaluation metrics of models in a model pool, where the evaluation metrics are used to indicate precision of the models; selecting, based on the evaluation metrics, a first model for a power prediction on a first electrical unit; and presenting a result of the power prediction of the first electrical unit using the first model.

20 Claims, 7 Drawing Sheets

Randomly select a model as a second
model or select, as the second model, a
model whose error value is the lowest

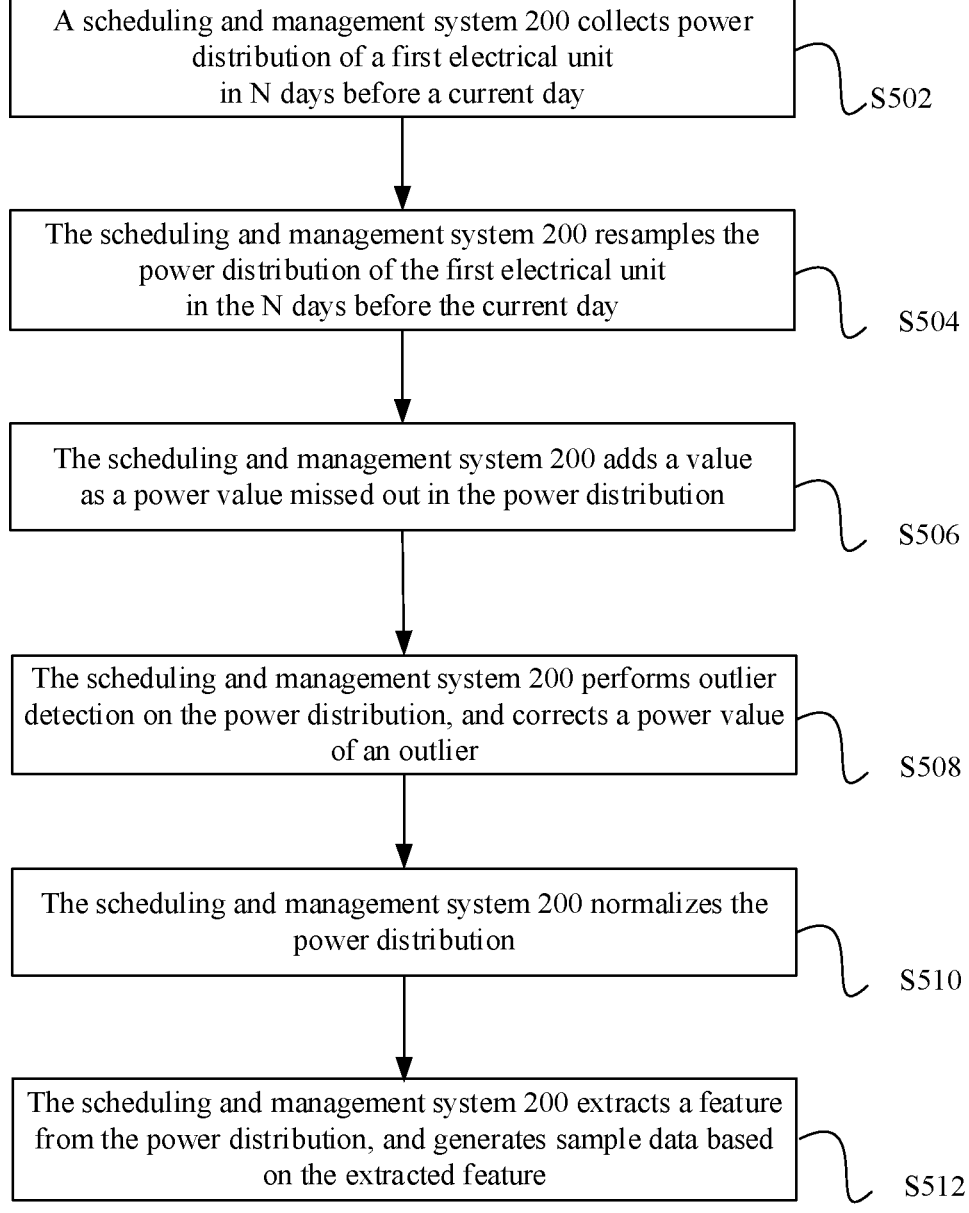

A scheduling and management system 200 collects power distribution of a first electrical unit in N days before a current day ⟶ S502

The scheduling and management system 200 resamples the power distribution of the first electrical unit in the N days before the current day ⟶ S504

The scheduling and management system 200 adds a value as a power value missed out in the power distribution ⟶ S506

The scheduling and management system 200 performs outlier detection on the power distribution, and corrects a power value of an outlier ⟶ S508

The scheduling and management system 200 normalizes the power distribution ⟶ S510

The scheduling and management system 200 extracts a feature from the power distribution, and generates sample data based on the extracted feature ⟶ S512

FIG. 5

POWER PREDICTION METHOD AND APPARATUS, AND DEVICE

CROSS-REFERENCE TO RELATED APPLICATIONS

This application is a continuation of International Patent Application No. PCT/CN2021/106964, filed on Jul. 17, 2021, which claims priority to Chinese Patent Application No. 202010966481.7, filed on Sep. 15, 2020. The disclosures of the aforementioned applications are hereby incorporated by reference in their entireties.

TECHNICAL FIELD

The present disclosure relates to the field of computer technologies, and in particular to a power prediction method and apparatus, and a device.

BACKGROUND

A data center (DC) is a globally collaborative network of specific devices and is used to transmit, accelerate, display, compute, and store data information on internet infrastructure. The data center consumes a large amount of power during operation. An energy storage system may be provided for the data center, to decrease electricity expenses and operating costs of the data center. The energy storage system may be charged when an electricity price is low, and be discharged when the electricity price is high, to supply power to the data center.

To maximize the use of the energy storage system, a scheduling and management system usually needs to provide a reasonable charge/discharge policy based on power of the data center in a future period with reference to information such as an electricity price curve and a battery state. Based on this, how to accurately predict power of the data center becomes a key concern in the industry.

SUMMARY

The present disclosure provides a power prediction method. According to the method, on-line assessment is performed on models in a model pool based on evaluation metrics of the models; and an appropriate model that is used for a power prediction on a first electrical unit is selected based on an assessment result. In this way, adaptation to a power change of the first electrical unit can be achieved; and prediction precision can be improved. The present disclosure further provides an apparatus, a device, a computer-readable storage medium, and a computer program product that correspond to the foregoing method.

According to a first aspect, the present disclosure provides a power prediction method. The method may be applied to a scheduling and management system, and specifically, a power prediction module in the scheduling and management system. The scheduling and management system (e.g., the power prediction module) performs a power prediction on a data center by using an electrical unit in the data center as a granularity. For ease of description, the following describes the power prediction method in the present disclosure by using an example in which a power prediction is performed on any electrical unit, namely, a first electrical unit, in the data center.

Specifically, the scheduling and management system obtains evaluation metrics of models in a model pool, where the evaluation metrics are used to indicate precision of the models. Then, the scheduling and management system selects, based on the evaluation metrics, a first model for the power prediction on the first electrical unit. Subsequently, the scheduling and management system presents a result of the power prediction on the first electrical unit.

According to the method, on-line assessment is performed on models in the model pool based on the evaluation metrics of the models; and an appropriate model that is used for a power prediction on a first electrical unit is selected based on an assessment result, instead of always using a single model for predicting power of the first electrical unit. In this way, adaptation to a power change of the first electrical unit can be achieved; prediction precision can be improved; and a service requirement can be met.

Further, different electrical units, for example, different electrical devices in a rack, may run different types of services. In this method, a power prediction is performed by using an electrical unit as a granularity, so that a power prediction for each electrical unit can have high precision. This improves precision of a power prediction for the entire data center.

In some possible implementations, the scheduling and management system may select the first model from the model pool based on the evaluation metrics; and predict future power distribution of the first electrical unit by using the first model based on historical power distribution of the first electrical unit.

The historical power distribution indicates power in at least one statistical period before a current moment. The future power distribution indicates power in at least one statistical period after the current moment. The statistical period is equal to an interval between two adjacent predictions for power distribution. Specifically, the statistical period may be a collection period for collecting a real power value. Certainly, in some embodiments, the statistical period may alternatively be an integral multiple of the collection period.

Power predictions of the first electrical unit in different statistical periods can be implemented by using the method. In addition, adaptation to a power change can be achieved; and prediction precision is high.

In some possible implementations, the evaluation metrics include error values. The error value may be specifically determined based on a predicted value of power and a real value of the power. When selecting the first model, the scheduling and management system may select, as the first model from the model pool based on the error values, a model whose error value meets a preset condition. In this way, a model with high prediction precision is selected for the power prediction for the first electrical unit, so that precision of the power prediction for the first electrical unit is kept high.

In some possible implementations, that the error value meets the preset condition includes: the error value is lower than a preset threshold, or the error value is the lowest.

Specifically, the scheduling and management system may compare the error values of the models with a preset threshold, and select, as the first model, a model whose error value is lower than the preset threshold. When there are a plurality of models whose error values are lower than the preset threshold, the scheduling and management system may randomly select one model from the plurality of models as the first model, or select, as the first model, a model whose error value is the lowest.

When none of the error values of the models in the model pool is lower than the preset threshold, if a time difference between current time and a moment when the models in the model pool are updated last time does not exceed preset time, a large quantity of computing resources may be consumed due to frequent updating of models, and model precision is not significantly improved when historical data changes slightly. In this case, the scheduling and management system may directly select, as the first model, a model whose error value is the lowest.

According to the foregoing method, an appropriate first model can be selected for the power prediction for the first electrical unit, so that the power prediction of the first electrical unit has high precision.

In some possible implementations, the scheduling and management system may update the models in the model pool based on the evaluation metrics; and then select the first model from the updated model pool based on evaluation metrics of the updated models. Specifically, when none of the evaluation metrics (e.g., the error values) of the models in the model pool is lower than the preset threshold, precision of the models is unsatisfactory; and there is at least one model that meets the following condition: a time difference between current time and a moment when the model is updated last time exceeds the preset time, for example, exceeds M days. In this case, historical data changes greatly, and the scheduling and management system may update the models based on updated historical data. In this way, the scheduling and management system selects, from the updated model pool based on evaluation metrics of the updated models, the first model for the power prediction on the first electrical unit. In one aspect, precision of the prediction is high. In another aspect, a balance between prediction precision and consumption of computing resources can be achieved.

In some possible implementations, the evaluation metrics are determined based on at least one of an interval error value and a single-point error value that are used when the power prediction is performed on the first electrical unit in the data center.

Specifically, the scheduling and management system may predict power distribution of the first electrical unit in a period, specifically, power distribution of the first electrical unit in at least one statistical period. The statistical period may be a power collection period. For example, when power is collected every 10 minutes, the collection period is 10 minutes. Correspondingly, the statistical period may be 10 minutes. Based on this, when predicting power of the first electrical unit in a plurality of statistical periods, the scheduling and management system may determine an error value of a model based on deviation values (e.g., absolute values of the deviation values) of power predictions that are performed on the first electrical unit in the statistical periods by using the model. The error value is the foregoing single-point error value.

Considering that electricity prices corresponding to different statistical periods may be the same, if a model has a high predicted value or a low predicted value in a plurality of statistical periods in time intervals corresponding to a same electricity price, the scheduling and management system may sum up deviation values that belong to a same time interval, to determine an error value in the interval; and then determine an error value of the model based on the error value of the model in each time interval. The error value is also referred to as an interval error value.

An interval error value is usually lower than a single-point error value. When an evaluation metric includes an interval error value, a quantity of updates of a model can be decreased, thereby avoiding consumption of a large quantity of computing resources caused by frequent updates of the model.

In some possible implementations, the scheduling and management system may further recommend, based on power distribution of a first electrical unit that already exists in the data center and a first model that is used for a prediction on the first electrical unit, an appropriate second model that is used for a power prediction on a second electrical unit newly added to the data center, thereby shortening a time spent determining the second model. Therefore, the scheduling and management system can achieve high prediction precision within a short time, thereby reducing power costs.

Specifically, the scheduling and management system obtains power distribution of a second electrical unit that is newly added to the data center; then determines at least one third electrical unit from the first electrical unit, where a similarity between power distribution of the third electrical unit and that of the second electrical unit reaches a preset similarity; and subsequently determines, as the second model that is used for the power prediction on the second electrical unit, the model that is used for the power prediction on the third electrical unit.

In some possible implementations, the scheduling and management system may directly determine, as the second model that is used for the power prediction on the second electrical unit, the model that is used for the power prediction on the third electrical unit. Therefore, time for determining the second model is greatly shortened. This ensures that the power prediction of the second electrical unit can achieve high precision in a short time.

In some possible implementations, the scheduling and management system may add, to a model pool of the second electrical unit, the model that is used for the power prediction on the at least one third electrical unit; obtain evaluation metrics of the power prediction that is performed on the second electrical unit by using models in the model pool of the second electrical unit; and select, from the model pool of the second electrical unit based on the evaluation metrics, the second model that is used for the power prediction on the second electrical unit. The models in the model pool are affiliated models of the second electrical unit. Selecting a model from the model pool based on the evaluation metrics ensures that the power prediction of the second electrical unit can reach high precision in a short time.

In some possible implementations, the scheduling and management system may further generate a training sample based on the historical power distribution of the first electrical unit; and train an initial model by using the training sample, to obtain a model in the model pool, thereby ensuring precision of the power prediction for the first electrical unit.

In some possible implementations, the model pool includes two or more models. For example, the model pool may include one or more types of tree models, neural network models, autoregressive models, and simple models. When the model pool includes one type of models, the model pool may specifically include different models of the type. For example, when the type of models are tree models, the model pool may include an extreme gradient boosting model and a random forest model. For another example, when the types of models are neural network models, the model pool may specifically include a deep neural network model and a long short-term memory network model.

The simple model is specifically a model in which a mathematically statistical value of historical power is used as a predicted value of future power. The mathematically statistical value may be any one of a weighted average value, an arithmetic average value, a median value, a maximum value, a minimum value, and the like of the historical power.

Because the simple model performs only mathematical statistics and does not need to be trained, adding the simple model to the model pool can resolve a cold start problem caused when a new electrical unit is added to the data center but a model such as a tree model, a neural network model, or an autoregressive model cannot be trained because an amount of historical data is small.

In some possible implementations, the first electrical unit is a set of electrical units, and the set of electrical units includes one or more of at least one electrical device, electrical devices in at least one rack, or electrical devices in at least one data center. In this method, a power prediction is performed by using one electrical unit as a prediction granularity, so that a power prediction for each electrical unit has high precision. For example, the electrical unit may be an independent electrical device (such as a server), or may be some or all of electrical devices in a single rack, or may be some or all of electrical devices in a data center. Predictions are performed on different sets of electrical devices by using a model pool that includes a plurality of models, so that a prediction granularity can be dynamically adjusted according to a service requirement, thereby improving precision of a power prediction on an entire data center.

In some possible implementations, the scheduling and management system may further present, by using a graphical user interface, the result of the power prediction that is performed on the first electrical unit by using at least one model in the model pool. In this way, a user may be assisted in making a decision.

According to a second aspect, the present disclosure provides a power prediction apparatus. The apparatus includes units configured to perform the power prediction method according to the first aspect or any one of the possible implementations of the first aspect.

According to a third aspect, the present disclosure provides a device. The device includes a processor and a memory. The processor and the memory communicate with each other. The processor is configured to execute instructions stored in the memory, so that the device is enabled to perform the power prediction method according to the first aspect or any one of the implementations of the first aspect.

According to a fourth aspect, the present disclosure provides a computer-readable storage medium. The computer-readable storage medium stores instructions, where the instructions instruct a device to perform the power prediction method according to the first aspect or any one of the implementations of the first aspect.

According to a fifth aspect, the present disclosure provides a computer program product including instructions. When the computer program product runs on a device, the device is enabled to perform the power prediction method according to the first aspect or any one of the implementations of the first aspect.

In this application, based on the implementations of the foregoing aspects, the implementations may be further combined to provide more implementations.

6

Figure 2:
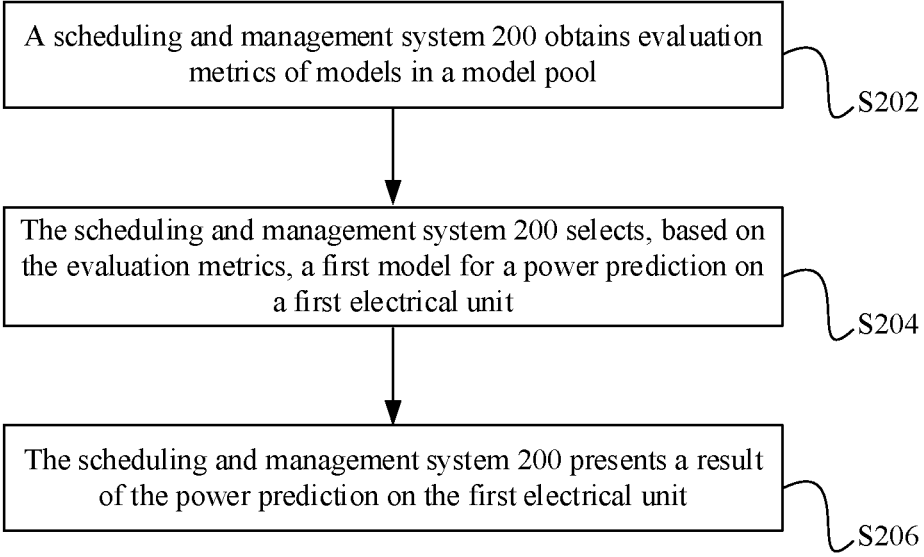
Figure 3:
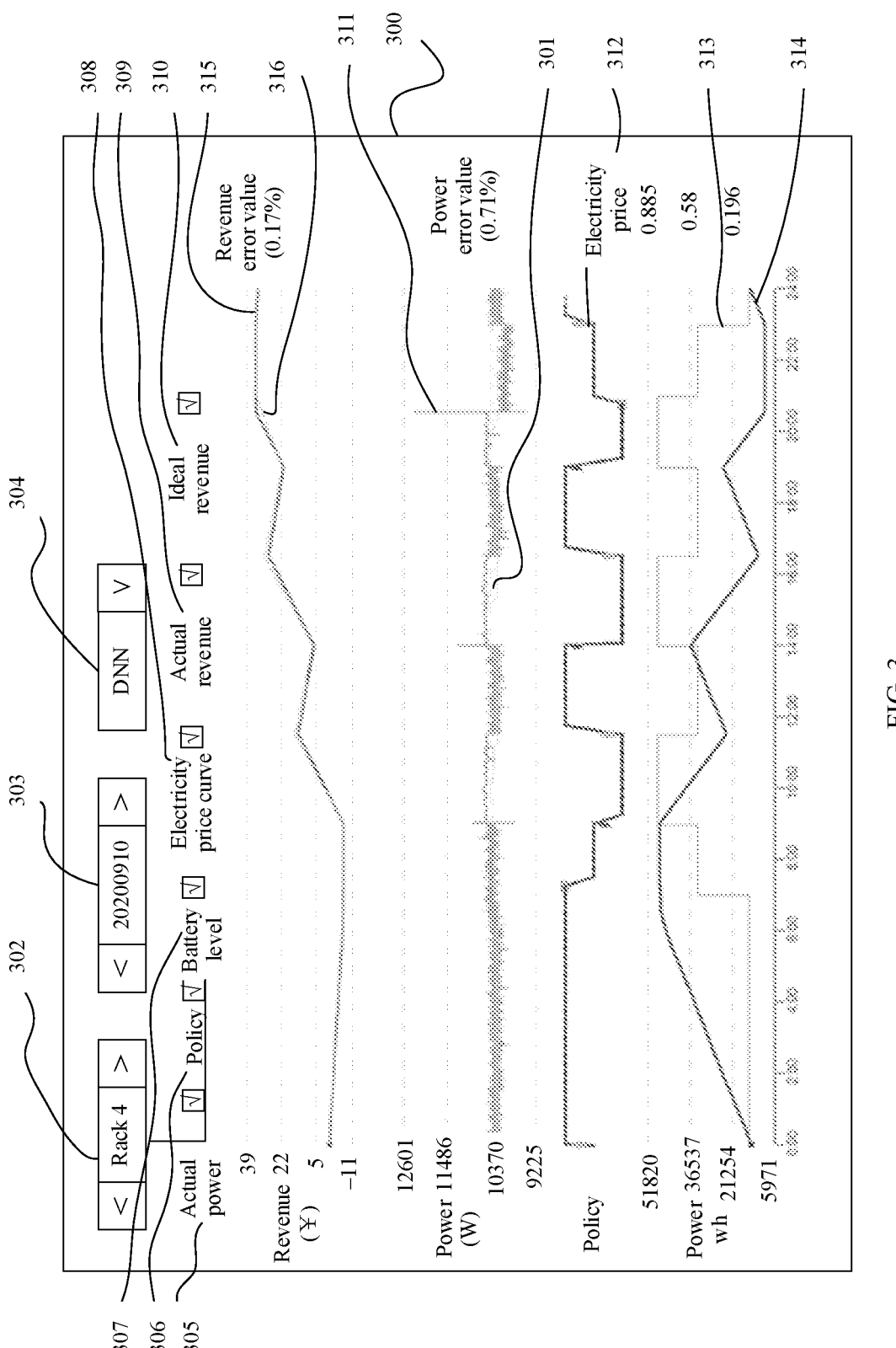
Figure 4A:
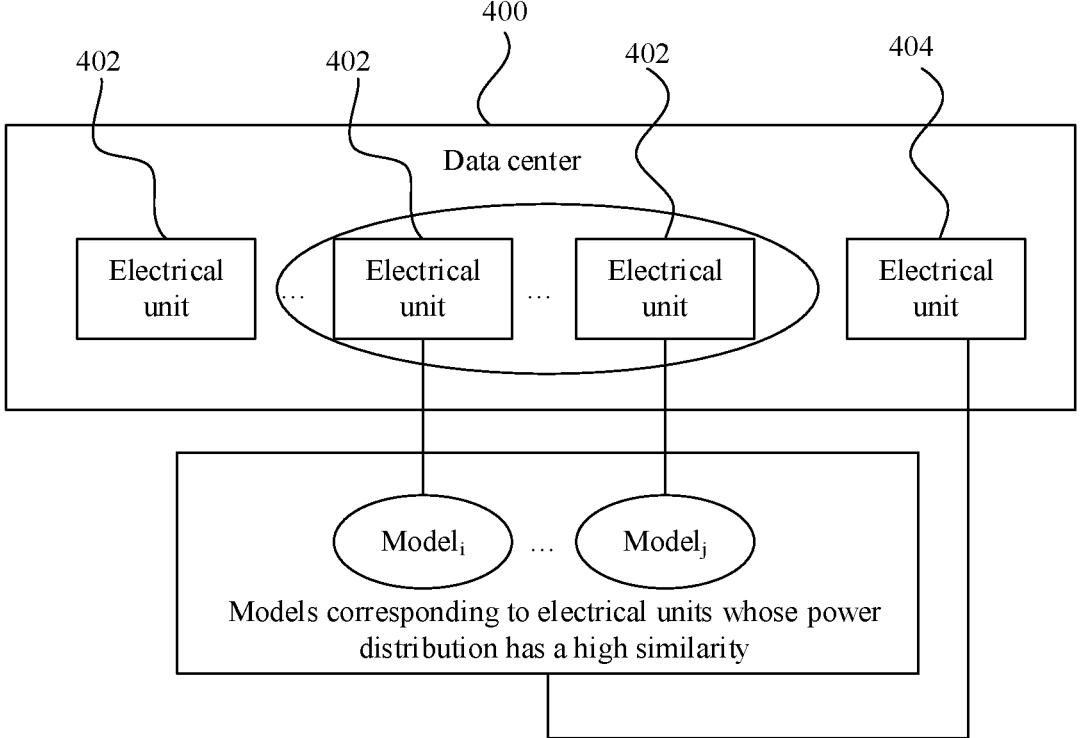
Figure 4B:
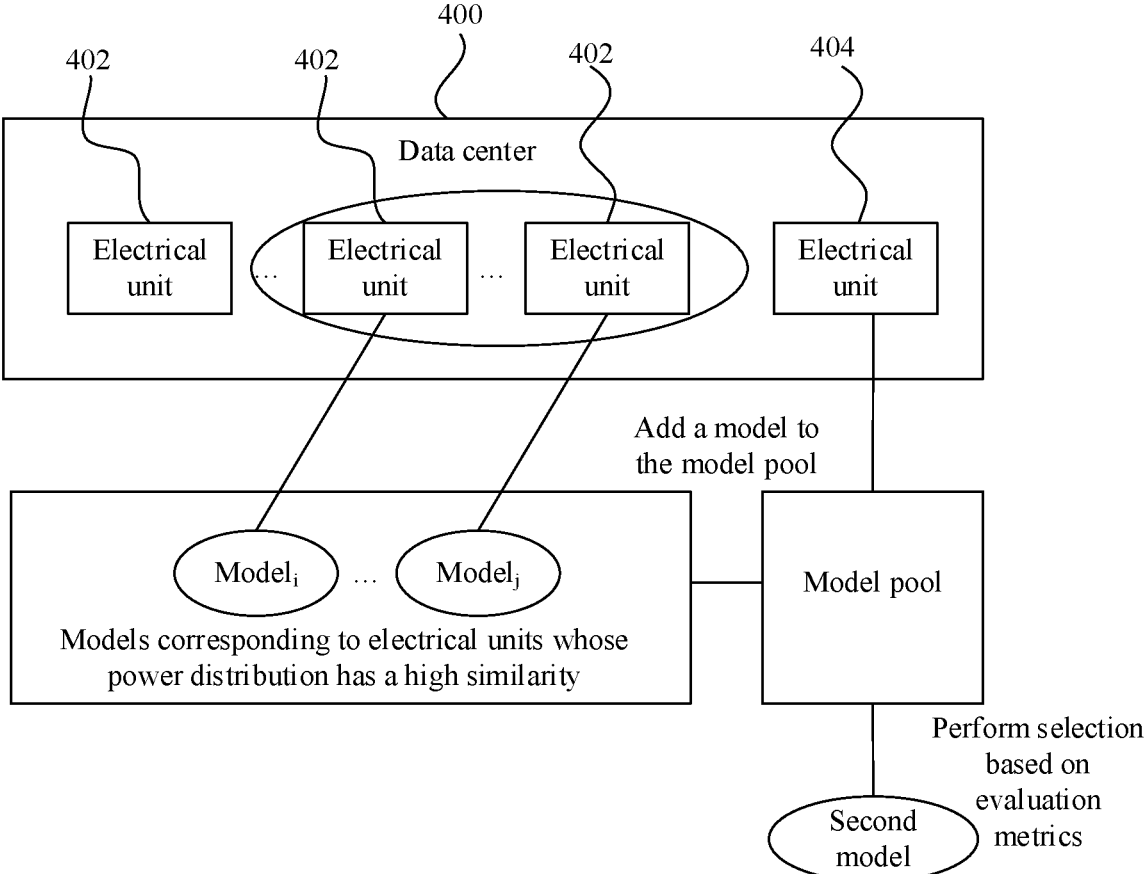
Figure 6:
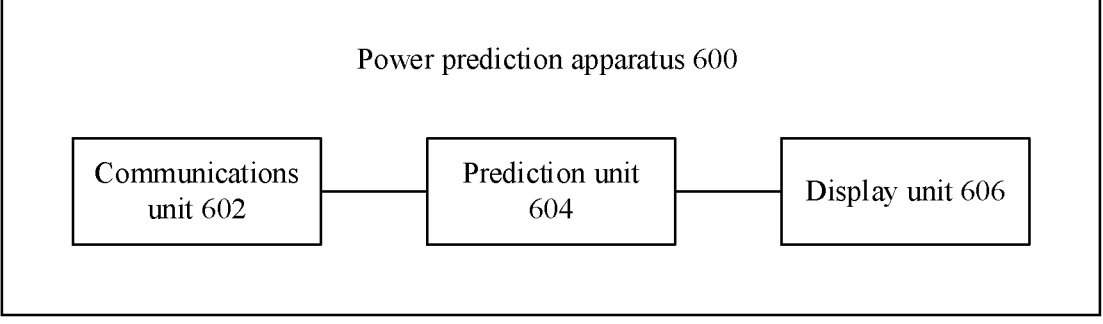
Figure 7:
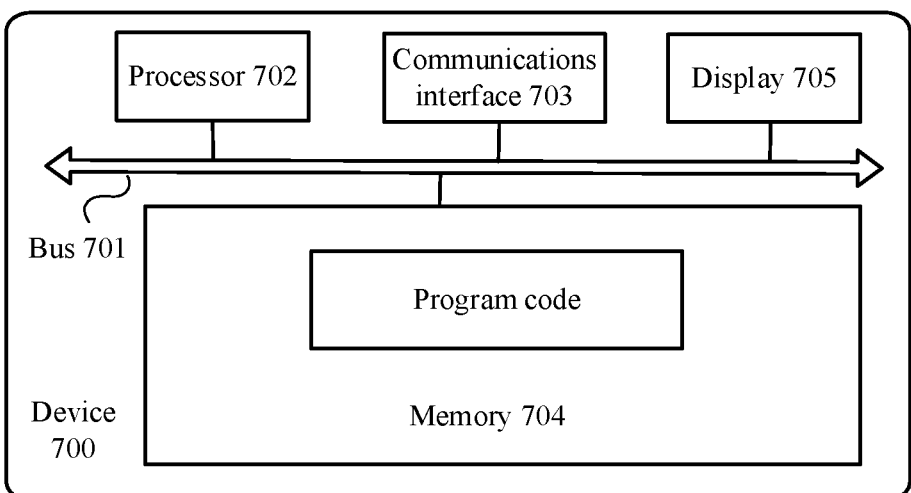

FIG. 2 is a flowchart of a power prediction method according to an embodiment of this application;

FIG. 3 is a schematic diagram of presenting a power prediction result according to an embodiment of this application;

FIG. 4A is a schematic diagram of determining a second model according to an embodiment of this application;

FIG. 4B is a schematic diagram of determining a second model according to an embodiment of this application;

FIG. 5 is a flowchart of generating sample data according to an embodiment of this application;

FIG. 6 is a schematic diagram of a structure of a power prediction apparatus according to an embodiment of this application; and FIG. 7 is a schematic diagram of a structure of a device according to an embodiment of this application.

DESCRIPTION OF EMBODIMENTS

For ease of understanding, some technical terms used in embodiments of the present disclosure are described first.

A data center is a globally collaborative network of specific devices and is used to transmit, accelerate, display, compute, and store data information on internet infrastructure. Devices, such as a server and a switch, that are configured to transmit, accelerate, display, compute, and store data information in the data center may be deployed in a rack. To ensure normal running of the data center, a power supply system is usually required to supply power to various devices in the data center.

The power supply system may include a mains power supply system. The mains power supply system is configured to directly transmit to an electrical party (e.g., a data center) through a power grid, electrical energy generated by a power station, to supply power to the electrical party. However, electricity prices specified by an electric power company for different periods may be different. To decrease electricity expenses and operating costs of the data center, an owner of the data center may construct an energy storage system, and control the energy storage system to be charged when an electricity price is low and to be discharged when the electricity price is high, to supply power to the data center. That is, the power supply system may further include an energy storage system.

The energy storage system includes at least one energy storage device. The energy storage device may be a device that supports charging and discharging, for example, may be an energy storage battery. The energy storage battery may include one or more of different types of batteries such as a lithium battery, a nickel-metal hydride (NIMH) battery, a lead-acid battery, and a sodium-sulfur battery.

Because a capacity of the energy storage system is limited, and electricity prices of the mains power supply system vary depending on time periods, a charge/discharge policy may be determined based on power distribution of the data center in a future period with reference to information such as an electricity price curve and a state of the energy storage device. The energy storage device in the energy storage system is charged and discharged according to a charge/discharge policy, so that a capability of the energy storage system is fully utilized, and power costs of the data center are decreased.

Power usage of the data center in a future period may be predicted based on power usage of the data center in a historical period. Processes of predicting power of the data center and determining the charge/discharge policy may be implemented by a scheduling and management system of the energy storage system.

Figure 1:
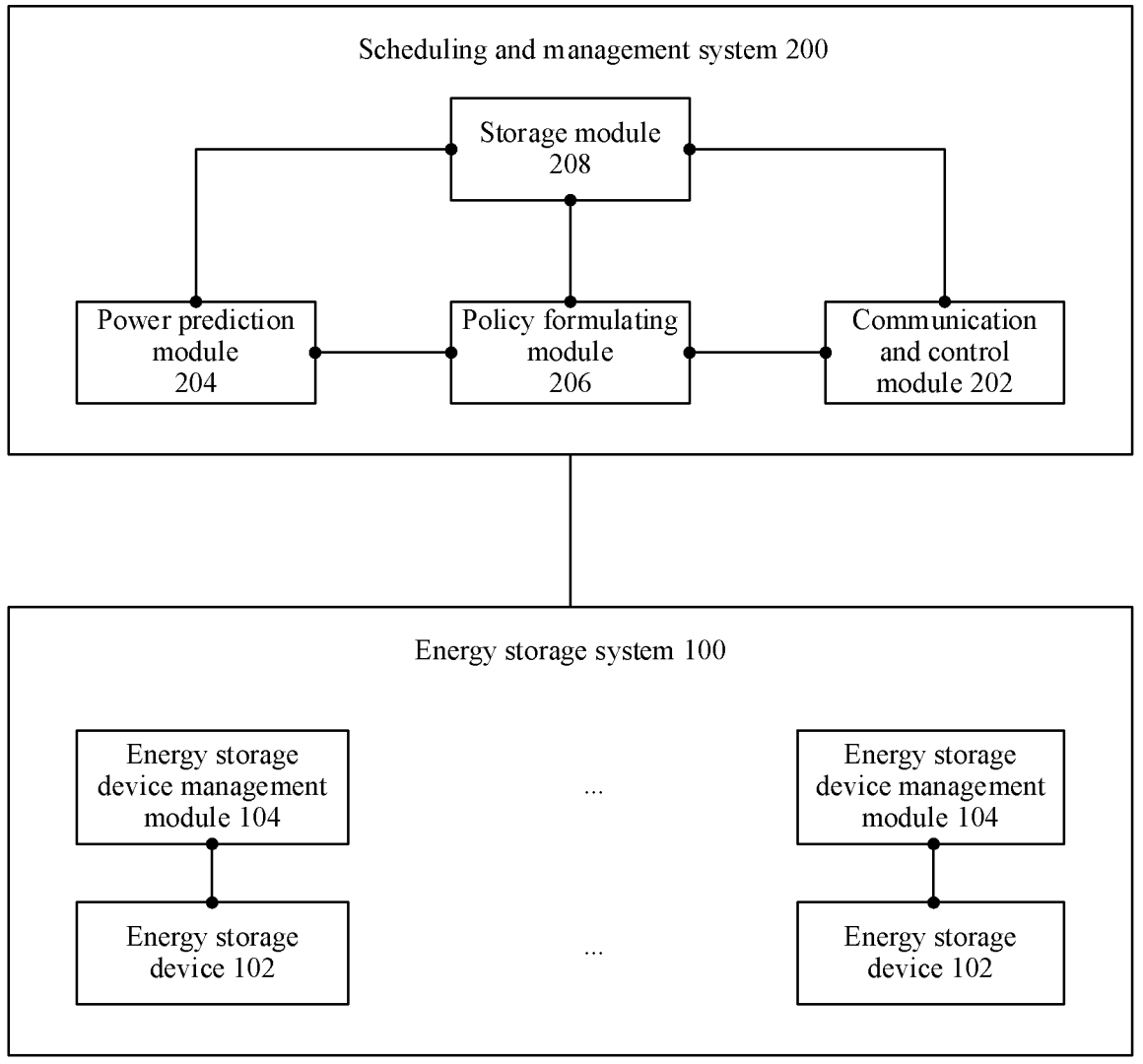
FIG. 1 is an architectural diagram of a system in which a scheduling and management system manages an energy storage system according to an embodiment of this application.

As shown in FIG. 1, an energy storage system 100 includes at least one energy storage device 102. The energy storage device 102 may specifically be an energy storage battery. A scheduling and management system 200 is configured to schedule and manage the energy storage system 100, for example, schedule the energy storage system 100 to be charged in some periods and to be discharged in some other periods, to supply power to a data center.

Specifically, the scheduling and management system 200 includes a communication and control module 202, a power prediction module 204, and a policy formulating module 206. The communication and control module 202 is configured to: communicate with the energy storage system 100 and the data center, and control the energy storage system 100, thereby implementing scheduling management of the energy storage system 100. The power prediction module 204 is configured to predict power of the data center, for example, predict power distribution of the data center in a future period. The policy formulating module 206 is configured to formulate a charge/discharge policy based on the predicted power, a state of the energy storage device 102, and an electricity price curve. The communication and control module 202 may obtain the charge/discharge policy and deliver the charge/discharge policy to the energy storage system 100.

In some possible implementations, the scheduling and management system 200 may further include a storage module 208. The storage module 208 may specifically be a database. The storage module 208 may be configured to store at least one of power such as historical power of the data center, a state of the energy storage device 102 in the energy storage system 100, and other information. The state of the energy storage device 102 includes one or more of a state of health (SoH), a state of charge (SoC), and the like.

The SoC is also referred to as remaining power, and is used to represent a ratio of a remaining capacity of the energy storage device 102 that is used for a period or is not used for a long time to a capacity of the energy storage device 102 that is in a fully charged state. The ratio may usually be represented by a percentage. A value of the SoC ranges from 0 to 1. When SoC=0, the battery is completely discharged. When SoC=1, the battery is fully charged. The SoH refers to a state of health of the energy storage device 102, and is mainly used to represent a battery aging degree.

In this way, the power prediction module 204 may obtain the historical power of the data center from the storage module 208, to predict future power of the data center. The policy formulating module 206 is configured to obtain status information of the energy storage device 102 from the storage module 208, to formulate the charge/discharge policy.

It should be further noted that the energy storage system 100 may further include an energy storage device management module 104. The communication and control module 202 of the scheduling and management system 200 may communicate with the energy storage device 102 through the energy storage device management module 104, and control the energy storage device 102. The energy storage device 102 may be an energy storage battery. The energy storage device management module 104 may be a battery management unit.

Currently, when performing a power prediction on a data center, the scheduling and management system 200 (e.g., the power prediction module 204) performs the prediction by using mainly a single model. However, due to an impact of a service running on an electrical device in the data center, there is a high probability that power of the electrical device changes greatly with time. If an original model cannot adapt to the change, prediction precision is greatly decreased. As a result, a charge/discharge policy formulated by the scheduling and management system 200 (e.g., the policy formulating module 206) is unsatisfactory.

In view of this, an embodiment of the present disclosure provides a power prediction method. In this method, the scheduling and management system 200 (e.g., the power prediction module 204) performs a power prediction on a data center by using an electrical unit in the data center as a granularity. The electrical unit may be a set of electrical devices. The set of electrical devices includes at least one electrical device, for example, one or more servers. In some embodiments, the set of electrical devices may alternatively be electrical devices in at least one rack, for example, some or all servers in one or more racks. In some other embodiments, the set of electrical units may alternatively be electrical devices in at least one data center, for example, some or all servers in one or more data centers.

For ease of description, in this embodiment of this application, a prediction process of the first electrical unit is used as an example for description. The first electrical unit may be any electrical unit in the data center. The scheduling and management system 200 may obtain evaluation metrics of models in a model pool, where the evaluation metrics may be used to indicate precision of the models. Then, the scheduling and management system 200 selects, based on the evaluation metrics, a first model for the power prediction on the first electrical unit and then presents a result of the power prediction on the first electrical unit.

According to the method, on-line assessment is performed on the models in the model pool based on the evaluation metrics of the models. An appropriate model is selected based on an assessment result for the power prediction on the first electrical unit, instead of always using a single model for predicting power of the first electrical unit. In this way, adaptation to a power change of the first electrical unit can be achieved, prediction precision can be improved, and a service requirement can be met.

Further, different electrical units, for example, electrical devices in different racks, may run different types of services. In this method, a power prediction is performed by using an electrical unit as a granularity, so that a power prediction on each electrical unit has high precision. This improves precision of a power prediction on the entire data center.

The scheduling and management system 200 provided in this embodiment of the present disclosure may be a software module. The software module may be deployed in a hardware device, to provide a service to the outside. The scheduling and management system 200 has a plurality of deployment manners. The following separately describes the plurality of deployment manners in detail.

In some possible implementations, the scheduling and management system 200 may be deployed in a cloud computing cluster. Modules of the scheduling and management system 200 may be centrally deployed in one cloud computing device (e.g., a cloud server) of the cloud computing cluster, or may be deployed in different cloud computing devices of the cloud computing cluster in a distributed manner. When the scheduling and management system 200 is deployed in a cloud computing cluster, the power prediction method provided in this embodiment of the present disclosure may be provided for a user in a form of a cloud service.

In some other possible implementations, the scheduling and management system 200 may be deployed in a local computing device. The local computing device is a computing device that is a local device and that is under direct control of a user, for example, may be a terminal such as a desktop computer or a notebook computer, or may be a local server.

The energy storage device 102 in the energy storage system 100 may be a hardware device. The hardware device is connected to the scheduling and management system 200. To facilitate power supply, the energy storage device 102 may be deployed in an information technology (IT) infrastructure rack, which is referred to as an IT rack for short. When the energy storage system 100 includes the energy storage device management module 104, the energy storage device management module 104 may be deployed in the IT rack together with the energy storage device 102.

It should be noted that FIG. 1 is merely an example for describing a deployment manner of the scheduling and management system 200 and the energy storage system 100. In another possible implementation of this embodiment of this application, the scheduling and management system 200 and the energy storage system 100 may alternatively be deployed in another manner.

The following describes, from a perspective of the scheduling and management system 200, the power prediction method provided in the embodiments of this application.

Referring to a flowchart of a power prediction method shown in FIG. 2, the method includes the following steps.

S202: The scheduling and management system 200 obtains evaluation metrics of models in a model pool.

The model pool is specifically a logical pool including at least one model. The model in the model pool is used to predict power of an electrical unit. Each electrical unit in a data center corresponds to one model pool. Model pools of different electrical units may be the same or different.

In some possible implementations, the model pool may include two or more models. For example, the model pool may include one or more of different types of models, for example, a tree model, a neural network model, an autoregressive model, and a simple model. When the model pool includes one type of the foregoing models, the model pool may specifically include different models of the type.

For example, when the model pool includes one type of models: tree models, the model pool may specifically include different models of tree models, such as an extreme gradient boosting (xgboost) model and a random forest model. For another example, when the model pool includes one type of models: neural network models, the model pool may specifically include different types of neural network models, such as a deep neural network (DNN) model and a long short-term memory (LSTM) network model.

The simple model is specifically a model in which a mathematically statistical value of historical power is used as a predicted value of future power. The mathematically statistical value may be any one of a weighted average value, an arithmetic average value, a median value, a maximum value, a minimum value, and the like of the historical power. For ease of understanding, the following provides descriptions with reference to specific examples. In an example, the simple model may use a weighted average of power in three days before a current day as a predicted value of power in a day after the current day.

Because the simple model performs only mathematical statistics and does not need to be trained, adding the simple model to the model pool can resolve a cold start problem caused when a new electrical unit is added to the data center but a model such as a tree model, a neural network model, or an autoregressive model cannot be trained because an amount of historical data is small.

Each model has an evaluation metric. The evaluation metric is specifically used to indicate precision of the model. In some embodiments, the evaluation metric may be an error value of a power prediction performed by using the model. The error value may be specifically determined based on a predicted value of power and a real value of the power.

The scheduling and management system 200 may predict power distribution of the first electrical unit in a period, specifically, power of the first electrical unit in at least one statistical period. The statistical period may be a power collection period. For example, when power is collected every 10 minutes, the collection period is 10 minutes. Correspondingly, the statistical period is 10 minutes. Based on this, when predicting power of the first electrical unit in a plurality of statistical periods, the scheduling and management system 200 may determine an error value of a model based on deviation values (e.g., absolute values of the deviation values) of power predictions that are performed on the first electrical unit in the statistical periods by using the model. The error value is also referred to as a single-point error value, and a specific calculation formula thereof is as follows:

$$\text{error}_{sin} = \frac{1}{N}\sum\nolimits_{i=1}^{N}\frac{|y_i - y_{prei}|}{y_i}. \tag{1}$$

$\text{error}_{sin}$ denotes a single-point error value. N denotes a quantity of statistical periods by which power is to be predicted. For example, if power of one day needs to be predicted and the statistical period is 10 minutes, N=(60±10)×24=144. $y_{prei}$ denotes a predicted value of power of an electrical unit in an $i^{th}$ statistical period. $y_i$ denotes a real power value (also referred to as an actual power value) of the electrical unit in the $i^{th}$ statistical period.

Considering that electricity prices corresponding to different statistical periods may be the same, if a model has a high predicted value or a low predicted value in a plurality of statistical periods in time intervals corresponding to a same electricity price, the scheduling and management system 200 may sum up deviation values that belong to a same time interval, to determine an error value in the interval; and then determine an error value of the model based on the error value of the model in each time interval. The error value is also referred to as an interval error value, and a specific calculation formula thereof is as follows:

$$\text{error}_{range} = \frac{1}{M}\sum\nolimits_{i=1}^{M}\frac{\left|\sum\nolimits_{j=1}^{Q}(y_j - y_{prej})\right|}{\overline{y_J}}. \tag{2}$$

$\text{error}_{range}$ denotes an interval error value. M denotes a quantity of electricity prices. For example, electricity prices in different time intervals may be 0.195, 0.58, and 0.885. In this case, a value of M may be 3. $y_{prej}$ denotes a predicted value of power of an electrical unit in a $j^{th}$ statistical period in a time interval. $y_j$ denotes a real power value of the electrical unit in the $j^{th}$ statistical period in the time interval.

$\bar{y}_j$ denotes an average value of real power values of the electrical unit in the time interval. Q denotes a quantity of a plurality of statistical periods in a time interval.

It should be noted that when one electricity price corresponds to a plurality of inconsecutive time intervals, for example, when one electricity price corresponds to the following time intervals: [0:00,7:00), [13:00,14: 00), and [23:00,24: 00), the scheduling and management system 200 may further combine the plurality of inconsecutive time intervals when determining an error value. Correspondingly, Q may be a sum of quantities of pluralities of statistical periods in the plurality of inconsecutive time intervals.

It can be learned according to formula (1) and formula (2) that an interval error value is usually lower than a single-point error value. When an evaluation metric includes an interval error value, a quantity of updates of a model can be decreased, thereby avoiding consumption of a large quantity of computing resources caused by frequent updates of the model.

In some possible implementations, the scheduling and management system 200 may alternatively determine an error value based on both the single-point error value and the interval error value. Details are as follows:

$$\text{error} = k_1 \frac{1}{N} \sum_{i=1}^{N} \frac{|y_i - y_{prei}|}{y_i} + k_2 \frac{1}{M} \sum_{i=1}^{M} \frac{\left|\sum_{j=1}^{Q} (y_j - y_{prej})\right|}{\bar{y}_j}. \quad (3)$$

error denotes an error value, and $k_1$ and $k_2$ denote weights of a single-point error value and an interval error value, respectively. A sum of $k_1$ and $k_2$ is 1.

S204: The scheduling and management system 200 selects, based on the evaluation metrics, a first model for a power prediction on a first electrical unit.

Specifically, the scheduling and management system 200 may select, as the first model from the model pool based on the evaluation metrics, a model that meets a precision requirement; and predict future power distribution of the first electrical unit by using the first model based on historical power distribution of the first electrical unit. The historical power distribution indicates power in at least one statistical period before a current moment. The future power distribution indicates power in at least one statistical period after the current moment. It should be noted that a quantity of statistical periods that correspond to the historical power distribution may be greater than or equal to a quantity of statistical periods that correspond to the future power distribution. For example, the scheduling and management system 200 may predict power distribution in one day after the current day by using power distribution in three days before the current day.

Precision can be represented by an evaluation metric, for example, an error value. Therefore, the scheduling and management system 200 may select, as the first model, a model whose error value meets a preset condition. Specifically, the scheduling and management system 200 may compare the error values of the models with a preset threshold, to select, as the first model, the model whose error value meets the preset condition. For example, the scheduling and management system 200 may select, as the first model, a model whose error value is lower than the preset threshold.

In some possible implementations, the model whose error value meets the preset condition may alternatively be a model whose error value is the lowest. Specifically, when none of the error values of all the models is lower than the preset threshold, and a time difference between current time and a moment when the models are updated last time does not exceed preset time, consumption of a large quantity of computing resources caused by frequent updating of models can be avoided, and model precision is not significantly improved because historical data changes slightly. In this case, the scheduling and management system 200 may select, as the first model, the model whose error value is the lowest. A result of the power prediction on the first electrical unit by using the first model may be provided for the policy formulating module 206 in the scheduling and management system 200, to formulate a charge/discharge policy.

The preset time may be specified based on an empirical value. For example, the preset time may be set to L days. It should be noted that for different models, values of L may be the same or different, and may be specified by the scheduling and management system 200 according to an actual situation.

In some possible implementations, the scheduling and management system 200 may update the models in the model pool, and then select, from the updated model pool based on evaluation metrics of the updated models, the first model for the power prediction on the first electrical unit. Specifically, when none of the evaluation metrics (e.g., the error values) of the models in the model pool is lower than the preset threshold, precision of the models is unsatisfactory; and there is at least one model that meets the following condition: a time difference between current time and a moment when the model is updated last time exceeds the preset time, for example, exceeds M days. In this case, historical data changes greatly, and the scheduling and management system 200 may update the models based on updated historical data.

Further, the scheduling and management system 200 may further store, in a database for subsequent use, a model type, an update time, a hyper parameter value of an updated model, a parameter value of the updated model, and an evaluation metric (e.g., an error value) of the updated model.

S206: The scheduling and management system 200 presents a result of the power prediction on the first electrical unit. Specifically, the scheduling and management system 200 may present, to a user through a graphical user interface (GUI), the result of the power prediction that is performed on the first electrical unit by using at least one model in the model pool. The at least one model may include the first model determined in S202. To help the user view a difference between prediction results of the models, the scheduling and management system 200 may alternatively present, to the user through the GUI, results of power predictions that are performed on the first electrical unit by using the models in the model pool. For example, the scheduling and management system 200 may present, to the user through the GUI, power distribution that is predicted by using each model in the model pool for the first electrical unit in one day after the current day.

The following describes, with reference to accompanying drawings, an example of presenting a power prediction result.

FIG. 3 is a schematic diagram of an interface presenting a power prediction result. As shown in FIG. 3, an interface 300 presents power distribution of a first electrical unit (which may be a rack 4 in this example) in a day that is obtained by using a first model (which may be a DNN model in this example). The power distribution is specifically denoted by a curve 301 in FIG. 3. Further, the interface 300 further includes an electrical unit selection control 302, a time selection control 303, and a model selection control 304. A user may select another electrical unit, another time, and/or another model in an increase/decrease manner or a drop-down selection manner by using the foregoing controls, so that the interface 300 presents power distribution of the another electrical unit, power distribution of an electrical unit at the another time, and/or power distribution that is of an electrical unit and that is predicted by using the another model. In some implementations, the user may select all models in a model pool by using the model selection control 304, so that the interface 300 displays power distribution predicted for each model in the model pool.

In some possible implementations, the interface 300 may further include at least one of an actual power display control 305, a policy display control 306, a battery level display control 307, an electricity price curve display control 308, an actual revenue display control 309, and an ideal revenue display control 310.

When the actual power display control 305 is triggered, for example, selected by the user, the scheduling and management system 200 may display, in the interface 300, actual power of an electrical unit, namely, a real power value. The actual power may be specifically shown in a curve 311 in FIG. 3.

When the policy display control 306 is triggered, the scheduling and management system 200 displays, in the interface 300, a charge/discharge policy formulated by the scheduling and management system 200. The charge/discharge policy may be specifically shown in a curve 312 in FIG. 3. When the battery level display control 307 is triggered, the scheduling and management system 200 may display, in the interface 300, power of the energy storage system 100. The power may be specifically shown in a curve 314 in FIG. 3. When the electricity price curve display control 308 is triggered, the scheduling and management system 200 may display an electricity price curve in the interface 300. The electricity price curve may be specifically shown in a curve 313 in FIG. 3.

Similarly, when the actual revenue display control 309 is triggered, the scheduling and management system 200 displays, in the interface 300, actual revenue that is obtained by supplying power to a data center via charging and discharging of the energy storage system 100. The revenue is specifically shown in a curve 315 in FIG. 3. When the ideal revenue display control 310 is triggered, the scheduling and management system 200 displays, in the interface 300, revenue that can be theoretically obtained by supplying power to the data center via charging and discharging of the energy storage system 100. The revenue is specifically shown in a curve 316 in FIG. 3.

Based on descriptions in the foregoing content, an embodiment of the present disclosure provides a power prediction method. In this method, the scheduling and management system 200 may obtain evaluation metrics of models in the model pool; select, from the model pool based on model precision indicated by the evaluation metrics, a first model for a power prediction on a first electrical unit; and present a result of the power prediction on the first electrical unit. In a running process of the first electrical unit, on-line assessment is performed on models in a model pool based on evaluation metrics of the models; and an appropriate model for a power prediction on a first electrical unit is selected based on an assessment result, instead of always using a single model for predicting power of the first electrical unit. Therefore, adaptation to a power change of the first electrical unit can be achieved; prediction precision is improved; and a service requirement is met.

In a possible implementation, in addition to the power prediction result shown in FIG. 3, results of predictions performed by using two or more models may also be presented in the interface 300. Specifically, the results corresponding to the models may be displayed on different tab pages or in different regions of a same page. Data corresponding to the models is displayed in the interface in different dimensions (e.g., power consumption, electric energy consumption, and other cost-related data). Maintenance personnel may manually select a model as a final model as required. A power prediction of the first electrical unit is performed by using the final model. Optionally, the maintenance personnel may alternatively select two or more models at a time as final models used for predicting power of the first electrical unit.

Further, the data center generally includes a large quantity of electrical units. When a new electrical unit is added to the data center, the scheduling and management system 200 may further recommend a model for a power prediction on the new electrical unit. For ease of description, in this embodiment of this application, the new electrical unit is referred to as a second electrical unit.

In some possible implementations, a database of the scheduling and management system 200 may store power distribution of the existing first electrical unit and store the first model (which specifically includes a type of the first model and a parameter value of the first model, and further includes a hyper parameter value of the first model in some cases) that is used for the prediction on the first electrical unit. In some embodiments, the scheduling and management system 200 further stores an evaluation metric of the first model, for example, an error value of the first model.

Based on this, the scheduling and management system 200 may recommend, based on power distribution of the first electrical unit that already exists in the data center and the first model that is used for a prediction on the first electrical unit, an appropriate second model for a power prediction on the second electrical unit newly added to the data center, thereby shortening a time spent on determining the second model. Therefore, the scheduling and management system 200 can achieve high prediction precision within a short time, thereby reducing power costs.

Specifically, the scheduling and management system 200 obtains power distribution of the second electrical unit newly added to the data center. The power distribution refers to a chronological power sequence formed by collecting a real power value in at least one collection period. Then, the scheduling and management system 200 determines similarities between the power distribution of the second electrical unit and the power distribution of the existing first electrical unit in the data center; and determines at least one third electrical unit from the first electrical unit based on the similarities, where a similarity between power distribution of the third electrical unit and that of the second electrical unit reaches a preset similarity. Subsequently, the scheduling and management system 200 determines, based on a model that is used for a power prediction on power distribution of the third electrical unit, the second model for the power prediction on the power distribution of the second electrical unit.

The power distribution may be represented as a dynamic chronological power sequence. Therefore, the scheduling and management system 200 may determine a power distribution similarity according to a dynamic time warping (DTW) algorithm. The DTW algorithm provides a similarity function (also referred to as a distance function) for time series data. The power distribution similarity can be obtained by substituting the chronological power sequence for the similarity function.

In some possible implementations, the scheduling and management system 200 may further determine the power distribution similarity according to another similarity function or distance function. For example, the scheduling and management system 200 may determine the power distribution similarity according to any one or more of a Euclidean distance, a Chebyshev distance, a Manhattan distance, and the like.

There may be a plurality of implementations in which the scheduling and management system 200 determines, based on the model that is used for the power prediction on the power distribution of the third electrical unit, the second model for the power prediction on the power distribution of the second electrical unit. This embodiment of the present disclosure provides, as examples, two implementations of determining the second model. The following describes the two implementations in detail with reference to accompanying drawings.

In a first implementation, as shown in FIG. 4A, the scheduling and management system 200 determines at least one third electrical unit from first electrical units 402 that already exist in a data center 400, where a similarity between power distribution of the at least one third electrical unit and that of a second electrical unit 404 newly added to the data center 400 reaches a preset similarity; and determines, based on a model that is used for a power prediction on the third electrical unit, a second model for a power prediction on the second electrical unit 404. The scheduling and management system 200 may randomly select, as the second model that is used for the power prediction on the second electrical unit 404, a model from the model that is used for the power prediction on the third electrical unit; or select, as the second model that is used for the power prediction on the second electrical unit 404, a model from the model that is used for the power prediction on the third electrical unit, where an error value of the selected model is lower than a preset threshold.

In a second implementation, as shown in FIG. 4B, the scheduling and management system 200 determines at least one third electrical unit from first electrical units 402 that already exist in a data center 400, where a similarity between power distribution of the at least one third electrical unit and that of a second electrical unit 404 newly added to the data center 400 reaches a preset similarity; and adds, to a model pool of the second electrical unit 404, a model that is used for a power prediction on the at least one third electrical unit. Further, the scheduling and management system 200 may alternatively add, to the model pool, prediction models of electrical units that are in the at least one third electrical unit and whose similarities rank top S. Then, the scheduling and management system 200 obtains evaluation metrics of power predictions performed on the second electrical unit by using models in the model pool of the second electrical unit 404; and selects, from the model pool of the second electrical unit 404 based on the evaluation metrics, a second model for a power prediction on the second electrical unit 404.

The power prediction method provided in this embodiment of the present disclosure is implemented based on a model in a model pool. The model in the model pool such as a tree model or a neural network model may be obtained via training. Specifically, the scheduling and management system 200 may generate sample data based on historical power of the first electrical unit; and then train an initial model by using the sample data, to obtain a model in the model pool of the first electrical unit.

First, a process in which the scheduling and management system 200 generates the sample data is described with reference to accompanying drawings.

Referring to a flowchart of generating sample data shown in FIG. 5, the following steps are specifically included.

S502: The scheduling and management system 200 collects power distribution of a first electrical unit in N days before a current day.

A value of N may vary depending on a type of a to-be-trained model. For example, when the to-be-trained model is a DNN model, the value of N may be 10; or when the to-be-trained model is a random forest model, the value of N may be 5. In addition, the value of N may also vary depending on a prediction span (that is, a length of a period for which a power prediction is performed) of the model. For example, when the model is used for predicting power in one day after the current day, the value of N may be 7; or when the model is used for predicting power in three days after the current day, a value of N may be 15.

S504: The scheduling and management system 200 resamples the power distribution of the first electrical unit in the N days before the current day.

The scheduling and management system 200 may collect power (a real power value) of the first electrical unit by a collection period. When the collection period is short, for example, 5 seconds, the scheduling and management system 200 obtains a large amount of data. Therefore, the scheduling and management system 200 may resample the foregoing historical power distribution, for example, may resample the historical power distribution by a prediction time interval (specifically, a statistical period). The statistical period may be an integral multiple of the collection period. In some cases, the statistical period may be equal to the collection period.

Considering stepped electricity prices, the scheduling and management system 200 may further determine the shortest electricity price span based on an electricity price curve. The electricity price span is the shortest time between moments when the electricity prices change. The scheduling and management system 200 can determine the shortest electricity price span when there are three or more electricity prices in the electricity price curve. The scheduling and management system 200 may determine a resampling period based on the shortest electricity price span. For example, when the shortest electricity price span is 30 minutes, the scheduling and management system may determine the resampling period as 30 minutes.

Noise in the original power distribution (the power distribution collected in S502) can be reduced by resampling the original power distribution. In addition, an amount of model training data can be effectively reduced by selecting an appropriate resampling period for resampling of the original power distribution, thereby accelerating an iteration speed of models.

S506: The scheduling and management system 200 adds a value as a power value missed out in the power distribution.

Considering that a power value at a time point may be missed out in the power distribution, the scheduling and management system 200 may further add a value as the power value missed out in the power distribution. Specifically, the scheduling and management system 200 may determine a time window, where the time window ends at a time point at which the power value is missed out, and starts at another time point that is preset duration before the time point. Then, a mathematically statistical value, such as an average value or a median value, of power values at different time points in the time window is added as the power value missed out at the time point.

S508: The scheduling and management system 200 performs outlier detection on the power distribution, and corrects a power value of an outlier.

The outlier is a point that is in the power distribution and at which a power value exceeds a normal range. Specifically, the scheduling and management system 200 may perform outlier detection on the power distribution by using an outlier detection algorithm. The outlier detection algorithm includes a statistical hypothesis testing algorithm, a local outlier factor (LOF) algorithm, an interquartile range (IQR) algorithm of a boxplot, and the like.

For ease of understanding, the following uses the IQR algorithm of the boxplot as an example for description. For power distribution, the scheduling and management system 200 may construct a corresponding boxplot. Five basic values are defined in the boxplot, which are specifically: a minimum (min); a lower quartile or a first quartile (Q1); a mid-value, a median, or a second quartile (Q2); an upper quartile or a third quartile (Q3); and a maximum (max). An interquartile range IQR represents spacing between the lower quartile Q1 and the upper quartile Q3.

The lower quartile Q1 is a value that ranks 25% in a sequence (e.g., a data sequence formed by power values in the power distribution) in which values are ranked in ascending order; the median Q2 is a value that ranks 50% in the sequence; and the upper quartile Q3 is a value that ranks 75% in the sequence.

It should be noted that the minimum and the maximum in the boxplot are not necessarily equal to the lowest value and the highest value of the power values in the power distribution, but are determined according to the IQR. Specifically, the minimum in the boxplot is Q1−1.5IQR, and the maximum in the boxplot is Q3+1.5IQR. The outlier is a point at which a power value is lower than Q1−1.5IQR, or a point at which a power value is higher than Q3+1.5IQR.

After detecting that there is an outlier, the scheduling and management system 200 may correct a power value at the outlier in a manner similar to the foregoing manner of adding a value as a missed value, for example, using a mathematically statistical value in a time window as a corrected power value.

S510: The scheduling and management system 200 normalizes the power distribution.

In some embodiments, to accelerate a convergence speed of a model to be trained, the scheduling and management system 200 may further normalize power values at all time points in the power distribution.

S512: The scheduling and management system 200 extracts a feature from the power distribution, and generates sample data based on the extracted feature.

Specifically, the scheduling and management system 200 may extract the feature in a feature engineering manner. Specifically, the scheduling and management system 200 may determine a time window, where the time window may be different from the foregoing time window that is determined for adding a value as a missed power value; then, obtain a mathematically statistical value, for example, at least one of an extremum value, an average value, and a variance, of power values at a plurality of time points in the time window; obtain power-related time information, for example, a moment, a corresponding day number (a number that is of a day in a week), and a month number (a number that is of a month in a year); and generate sample data based on the foregoing mathematically statistical value and the time information that are in the time window. The sample data may be represented as (X, Y), where X includes a chronological power sequence in the time window and the extracted feature, such as the extremum value, the average value, and the variance of the foregoing power values, the moment, the day number, and the month number; and Y represents supervision information, where the supervision information may be a chronological power sequence in a time window after the foregoing time window. Correspondingly, when a prediction is performed by using a model, a feature may also be extracted from the chronological power sequence in the time window. The chronological power sequence and the extracted feature are used as input.

Alternatively, in some other possible implementations, the scheduling and management system 200 may directly generate sample data according to a chronological power sequence of a time window and a chronological power sequence of a time window after the foregoing time window. In other words, in the sample data (X, Y), X represents a chronological power sequence of a time window; and Y represents supervision information, where the supervision information is a feature in a time window after the foregoing time window.

It should be noted that lengths of the time windows corresponding to X and Y may be equal or unequal. A length of the time window corresponding to X may be longer than a length of the time window corresponding to Y. For example, the length of the time window corresponding to X may be three days, and the length of the time window corresponding to Y may be one day.

In this embodiment, S504 to S510 are optional steps. In another possible implementation of this embodiment of this application, S504 to S510 may be skipped.

With reference to accompanying drawings, the following further describes a process in which the scheduling and management system 200 trains and validates each model. After generating the plurality of pieces of sample data, the scheduling and management system 200 may further separately divide the sample data into a training set and a validation set. For example, the scheduling and management system 200 may separately divide the sample data into a training set and a validation set based on a first preset ratio, for example, 8:2. In some embodiments, the scheduling and management system 200 may separately divide the sample data into a training set, a validation set, and a test set. For example, the scheduling and management system 200 may separately divide the sample data into a training set, a validation set, and a test set based on a second preset ratio, for example, 7:2:1.

The training set is used to perform fitting on a model. The validation set is used to validate a model obtained via training based on sample data (namely, a training sample) in the training set, to adjust a hyper parameter of the model and preliminarily assess a capability, such as prediction precision, of the model. The test set is used to test a generalization capability of a model that passes the verification.

After obtaining a data sample, the scheduling and management system 200 may use the sample data (namely, the training sample) in the training set as input of a model pool, to perform distributed model training. In a model training phase, the scheduling and management system 200 may select and tune a hyper parameter of a model based on a search space of the hyper parameter by using an automatic parameter tuning method, for example, a grid search algorithm or a particle swarm optimization (PSO) algorithm; select and tune a parameter of the model by using a loss function obtained after a training sample is input to the model; and stop training when the model converges. Further, the scheduling and management system 200 may validate, by using sample data (namely, a validation sample) in the validation set, a model obtained via training, to preliminarily assess precision of the model. When the precision does not meet a requirement, the scheduling and management system 200 may further tune the hyper parameter, and then retrain the model. When the model subject to the retraining passes the verification, the model can be used for predicting power.

In addition, during a power prediction, considering that an outlier may exist in the power distribution, in the embodiment shown in FIG. 2, the scheduling and management system 200 may alternatively correct a power value of the outlier in the power distribution before determining an evaluation metric of the model. The scheduling and management system 200 may detect the outlier by using a method that is the same as or similar to an outlier detection method used in a model training process. For example, the scheduling and management system 200 detects the outlier by using the interquartile range algorithm of the boxplot; then corrects a power value at the outlier by using a mathematically statistical value of power values at a plurality of time points in a time window that ends at the outlier; and determines the evaluation metric of the model based on the corrected power value. In this way, accuracy can be improved.

The foregoing describes in detail the power prediction method provided in the embodiments of the present disclosure with reference to FIG. 1 to FIG. 5. The following describes an apparatus and a device provided in the embodiments of the present disclosure with reference to the accompanying drawings.

FIG. 6 is a schematic diagram of a structure of a power prediction apparatus. The apparatus 600 includes: a communications unit 602 configured to obtain evaluation metrics of models in a model pool, where the evaluation metrics are used to indicate precision of the models; a prediction unit 604 configured to select, based on the evaluation metrics, a first model for a power prediction on a first electrical unit, where the first electrical unit is any electrical unit in a data center; and a display unit 606 configured to present a result of the power prediction for the first electrical unit.

In some possible implementations, the prediction unit 604 is further configured to: select the first model from the model pool based on the evaluation metrics; and predict future power distribution of the first electrical unit by using the first model based on historical power distribution of the first electrical unit, where the historical power distribution indicates power in at least one statistical period before a current moment, and the future power distribution indicates power in at least one statistical period after the current moment.

In some possible implementations, the evaluation metrics include error values, and the prediction unit 604 is further configured to: select, as the first model from the model pool based on the error values, a model whose error value meets a preset condition.

In some possible implementations, that the error value meets the preset condition includes: the error value is lower than a preset threshold, or the error value is the lowest.

In some possible implementations, the prediction unit 604 is further configured to: update the models in the model pool based on the evaluation metrics; and select the first model from the updated model pool based on evaluation metrics of the updated models.

In some possible implementations, the evaluation metrics are determined based on at least one of an interval error value and a single-point error value that are used when the power prediction is performed on the first electrical unit in the data center.

In some possible implementations, the communications unit 602 is further configured to: obtain power distribution of a second electrical unit that is newly added to the data center.

The apparatus 600 further includes: a determining unit configured to determine at least one third electrical unit from the first electrical unit, where a similarity between power distribution of the at least one third electrical unit and that of the second electrical unit reaches a preset similarity.

The determining unit is further configured to determine, based on a model that is used for a power prediction on the third electrical unit, a second model that is used for a power prediction on the second electrical unit.

In some possible implementations, the determining unit is further configured to: determine, as the second model that is used for the power prediction on the second electrical unit, the model that is used for the power prediction on the third electrical unit.

In some possible implementations, the determining unit is further configured to: add, to a model pool of the second electrical unit, the model that is used for the power prediction on the at least one third electrical unit; obtain evaluation metrics of the power prediction that is performed on the second electrical unit by using models in the model pool of the second electrical unit; and select, from the model pool of the second electrical unit based on the evaluation metrics, the second model for the power prediction on the second electrical unit.

In some possible implementations, the apparatus 600 further includes: a generation unit configured to generate a training sample based on the historical power distribution of the first electrical unit; and a training unit configured to train an initial model by using the training sample, to obtain a model in the model pool.

In some possible implementations, the model pool includes two or more models.

In some possible implementations, the first electrical unit is a set of electrical devices, and the set of electrical devices includes one or more of at least one electrical device, electrical devices in at least one rack, or electrical devices in at least one data center.

In some possible implementations, the display unit is further configured to: present, by using a graphical user interface, the result of the power prediction that is performed on the first electrical unit by using at least one model in the model pool.

The power prediction apparatus 600 in this embodiment of the present disclosure may correspondingly perform the method described in the embodiments of this application, and the foregoing and other operations and/or functions of the modules/units of the power prediction apparatus 600 are respectively used for implementing corresponding procedures of the method in the embodiment shown in FIG. 2. For brevity, details are not described herein again.

An embodiment of the present disclosure further provides a device 700. The device 700 may be an end-side device such as a notebook computer or a desktop computer, or may be a computer cluster in a cloud environment or an edge environment, or a combination of the end-side device and a device in the cloud environment and the edge environment. The device 700 is further configured to implement a function of the power prediction apparatus 600 in the embodiment shown in FIG. 6.

FIG. 7 is a schematic diagram of a structure of an electronic device 700. As shown in FIG. 7, the electronic device 70 includes a bus 701, a processor 702, a communications interface 703, a memory 704, and a display 705. The processor 702, the memory 704, the communications interface 703, and the display 705 communicate with each other by using the bus 701.

The bus 701 may be a Peripheral Component Interconnect (PCI) bus, an Extended Industry Standard Architecture (EISA) bus, or the like. The bus may include an address bus, a data bus, a control bus, and the like. For ease of representation, only one bold line is used for representation in FIG. 7, but this does not mean that there is only one bus or only one type of bus.

The processor 702 may be a central processing unit (CPU). In some embodiments, the processor 702 may alternatively be any one or more of processors such as a graphics processing unit (GPU), a microprocessor (MP), and a digital signal processor (DSP).

The communications interface 703 is configured to communicate with the outside. For example, the communications interface 703 may be configured to: obtain the evaluation metrics of the models in the model pool, or obtain the power distribution of the second electrical unit that is newly added to the data center.

The memory 704 may include a volatile memory, for example, a random-access memory (RAM). The memory 704 may further include a non-volatile memory, for example, a read-only memory (ROM), a flash memory, a hard disk drive (HDD), or a solid-state drive (SSD).

The display 705 is an input/output (I/O) device. The device can display an electronic file such as an image and a text on a screen for users to view. Based on different manufacturing materials, the display 705 may be a liquid-crystal display (LCD), an organic light-emitting diode (OLED) display, or the like.

The memory 704 stores executable code. The processor 702 executes the executable code to perform the foregoing power prediction method.

Specifically, when the embodiment shown in FIG. 6 is implemented, and the units of the power prediction apparatus 600 described in the embodiment in FIG. 6 are implemented by using software, software or program code that is required for performing a function of the prediction unit 604 in FIG. 6 is stored in the memory 704.

A function of the communications unit 602 is implemented by using the communications interface 703. The communications interface 703 is configured to: obtain the evaluation metrics of the models in the model pool, and transmit the evaluation metrics of the models to the processor 702 by using the bus 701. The processor 702 executes program code that corresponds to each unit and that is stored in the memory 704, for example, executes program code corresponding to the prediction unit 604, to perform a step of selecting, based on the evaluation metrics, a first model for a power prediction on a first electrical unit. Then, the processor 702 transmits, to the display 705 by using the bus, a result of the power prediction for the first electrical unit. The display 705 presents the result of the power prediction for the first electrical unit.

It should be understood that the electronic device 700 in this embodiment of the present disclosure may correspond to the power prediction apparatus 600 in FIG. 6 in the embodiments of this application. The electronic device 700 is configured to implement an operation step, of the method in FIG. 2, performed by a corresponding body in the method. For brevity, details are not described herein again.

Some or all of the foregoing embodiments may be implemented by using software, hardware, firmware, or any combination thereof. When software is used to implement the embodiments, some or all of the embodiments may be implemented in a form of a computer program product.

The computer program product includes one or more computer instructions. When the computer instructions are loaded and executed on a computer, procedures or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a web site, computer, training device, or data center to another website, computer, training device, or data center in a wired (e.g., a coaxial cable, an optical fiber, or a digital subscriber line (DSL)) or wireless (e.g., infrared, radio, or microwave) manner. The computer-readable storage medium may be any usable medium accessible by the computer, or a data storage device, such as a training device or a data center, integrating one or more usable media. The usable medium may be a magnetic medium (e.g., a floppy disk, a hard disk, or a magnetic tape), an optical medium (e.g., a digital video disc (DVD)), a semiconductor medium (e.g., an SSD), or the like.

The foregoing descriptions are merely specific implementations of this application. Any variation or replacement readily figured out by a person skilled in the art based on the specific implementations provided in the present disclosure shall fall within the protection scope of this application.

What is claimed is:

1. A method comprising:

obtaining evaluation metrics of models in a model pool, wherein the evaluation metrics indicate precisions of the models, wherein the evaluation metrics are based on an interval error value used during a power prediction, and wherein the interval error value is based on a summation of deviation values between a predicted power value of the models and an actual power value of the models in a plurality of statistical periods in a electricity price time interval;

selecting, from the model pool and based on the evaluation metrics, a first model for a power prediction of an electrical unit in a data center;

performing the power prediction using the first model to obtain a result;

presenting the result of the power prediction;

determining a charge/discharge policy based on the power prediction and based on electricity prices of a mains power, wherein the charge/discharge policy charges an energy storage system from the mains power when the electricity prices are relatively low and discharges from the energy storage system to the electrical unit when the electricity prices are relatively high; and implementing the charge/discharge policy.

2. The method of claim 1, further comprising predicting future power distribution of the electrical unit using the first model based on a historical power distribution of the electrical unit, wherein the historical power distribution indicates power in at least a first statistical period before a current moment, and wherein the future power distribution indicates power in at least a second statistical period after the current moment.

3. The method of claim 1, wherein the evaluation metrics comprise error values, and wherein the method further comprises further selecting the first model based on the error values, wherein the first model has a first error value that satisfies a preset condition.

4. The method of claim 3, wherein the preset condition is that the first error value is lower than a preset threshold or that the first error value is lowest among the error values.

5. The method of claim 1, wherein selecting the first model comprises:

updating the models in the model pool based on the evaluation metrics to obtain updated models; and selecting the first model from the model pool based on the evaluation metrics of the updated models.

6. The method of claim 1, wherein the evaluation metrics are further based on a single-point error value used during the power prediction.

7. The method of claim 1, wherein the model pool comprises two or more models.

8. The method of claim 1, wherein the electrical unit is a set of electrical devices comprising at least one electrical device, electrical devices in at least one rack, or electrical devices in at least one data center.

9. The method of claim 1, wherein presenting the result of the power prediction comprises presenting, through a graphical user interface, the result of the power prediction.

10. A device comprising:

a memory configured to store instructions; and one or more processors configured to execute the instructions to:

obtain evaluation metrics of models in a model pool, wherein the evaluation metrics indicate precisions of the models, wherein the evaluation metrics are based on an interval error value used during a power prediction, and wherein the interval error value is based on a summation of deviation values between a predicted power value of the models and an actual power value of the models in a plurality of statistical periods in a electricity price time interval;

select, from the model pool and based on the evaluation metrics, a first model for a power prediction of an electrical unit in a data center;

perform the power prediction using the first model to obtain a result;

present the result of the power prediction; and determine a charge/discharge policy based on the power prediction and based on electricity prices of a mains power, wherein the charge/discharge policy charges an energy storage system from the mains power when the electricity prices are relatively low and discharges from the energy storage system to the electrical unit when the electricity prices are relatively high.

11. The device of claim 10, wherein the one or more processors are further configured to execute the instructions to predict future power distribution of the electrical unit using the first model based on a historical power distribution of the electrical unit, wherein the historical power distribution indicates power in at least a first statistical period before a current moment, and wherein the future power distribution indicates power in at least a second statistical period after the current moment.

12. The device of claim 10, wherein the evaluation metrics comprise error values, and wherein the one or more processors are further configured to execute the instructions to select, the first model based on the error values, wherein the first model has a first error value that satisfies a preset condition.

13. The device of claim 12, wherein the preset condition is that the first error value is lower than a preset threshold or that the first error value is lowest among the error values.

14. The device of claim 10, wherein the one or more processors are further configured to execute the instructions to:

update the models in the model pool based on the evaluation metrics to obtain updated models; and select the first model from the model pool based on the evaluation metrics of the updated models.

15. The device of claim 10, wherein the evaluation metrics are further based on a single-point error value used during the power prediction.

16. The device of claim 10, wherein the model pool comprises two or more models.

17. The device of claim 10, wherein the electrical unit is a set of electrical devices comprising at least one electrical device, electrical devices in at least one rack, or electrical devices in at least one data center.

18. The device of claim 10, wherein the one or more processors are further configured to execute the instructions to present, through a graphical user interface, the result of the power prediction.

19. A non-transitory computer-readable storage medium, wherein the non-transitory computer-readable storage medium stores instructions, and wherein the instructions when executed by a processor of a device, cause the device to:

obtain evaluation metrics of models in a model pool, wherein the evaluation metrics indicate precisions of the models, wherein the evaluation metrics are based on an interval error value used during a power prediction, and wherein the interval error value is based on a summation of deviation values between a predicted power value of the models and an actual power value of the models in a plurality of statistical periods in a electricity price time interval;

select, from the model pool and based on the evaluation metrics, a first model for a power prediction of an electrical unit in a data center;

perform the power prediction using the first model to obtain a result;

present the result of the power prediction; and determine a charge/discharge policy based on the power prediction and based on electricity prices of a mains power, wherein the charge/discharge policy charges an energy storage system from the mains power when the electricity prices are relatively low and discharges from the energy storage system to the electrical unit when the electricity prices are relatively high.

20. The non-transitory computer-readable storage medium of claim 19, wherein the evaluation metrics are further based on a single-point error value used during the power prediction.

* * * * *